(No Model.)  2 Sheets—Sheet 1.

J. LALOR.
PHOTOGRAPHIC MAGAZINE CAMERA.

No. 436,060.  Patented Sept. 9, 1890.

Witnesses:—
Louis M. F. Whitehead
Wm. F. Henning

Inventor:—
James Lalor
by Dayton, Poole & Brown
Attorneys

THE NORRIS PETERS CO., PHOTO-LITHO., WASHINGTON, D. C.

(No Model.) 2 Sheets—Sheet 2.
J. LALOR.
PHOTOGRAPHIC MAGAZINE CAMERA.
No. 436,060. Patented Sept. 9, 1890.
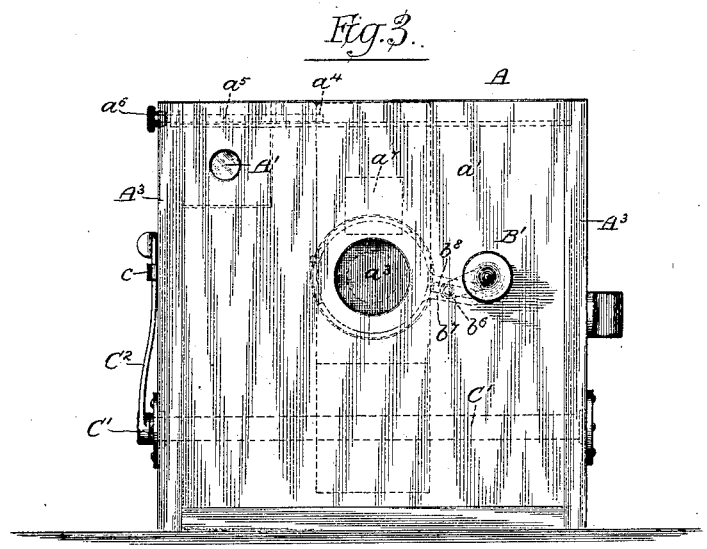
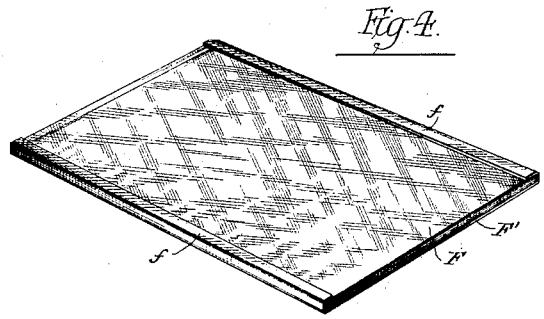
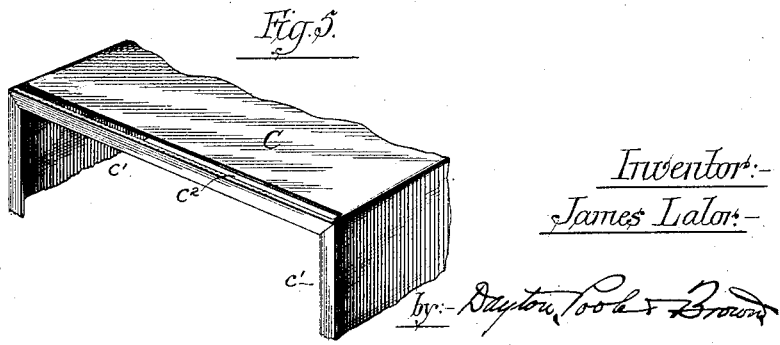
Witnesses:
Louis M. F. Whitehead.
Wm. F. Henning
Inventor:
James Lalor
by: Dayton, Poole & Brown
Attorneys

UNITED STATES PATENT OFFICE.

JAMES LALOR, OF AURORA, ILLINOIS.

PHOTOGRAPHIC MAGAZINE-CAMERA.

SPECIFICATION forming part of Letters Patent No. 436,060, dated September 9, 1890.

Application filed January 14, 1890. Serial No. 336,863. (No model.)

*To all whom it may concern:*

Be it known that I, JAMES LALOR, of Aurora, in the county of Kane and State of Illinois, have invented certain new and useful Improvements in Photographic Magazine-Cameras; and I do hereby declare that the following is a full, clear, and exact description thereof, reference being had to the accompanying drawings, and to the letters of reference marked thereon, which form a part of this specification.

This invention relates to improvements in magazine-cameras, whereby a number of plates adapted for exposure are confined in a suitable compartment in the camera; are successively brought into position for exposure to the light when desired, and after exposure are successively carried to a suitable receiving-chamber and deposited therein, whereby the light is excluded from the said plate thereafter and at times when the light is being admitted to the interior of the camera through the lens and is being directed upon a second plate in the first-mentioned compartment. The invention also consists in the details of construction, hereinafter more fully described.

Figure 1:
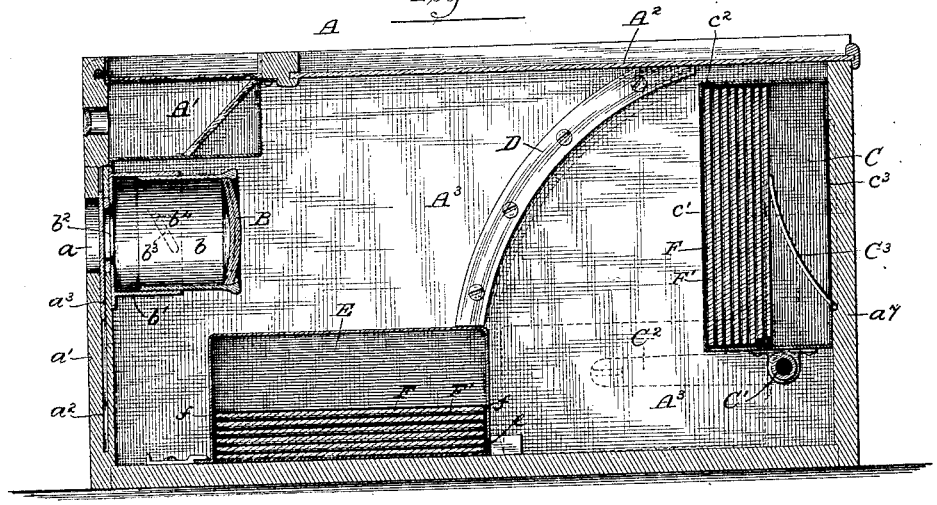
Figure 2:
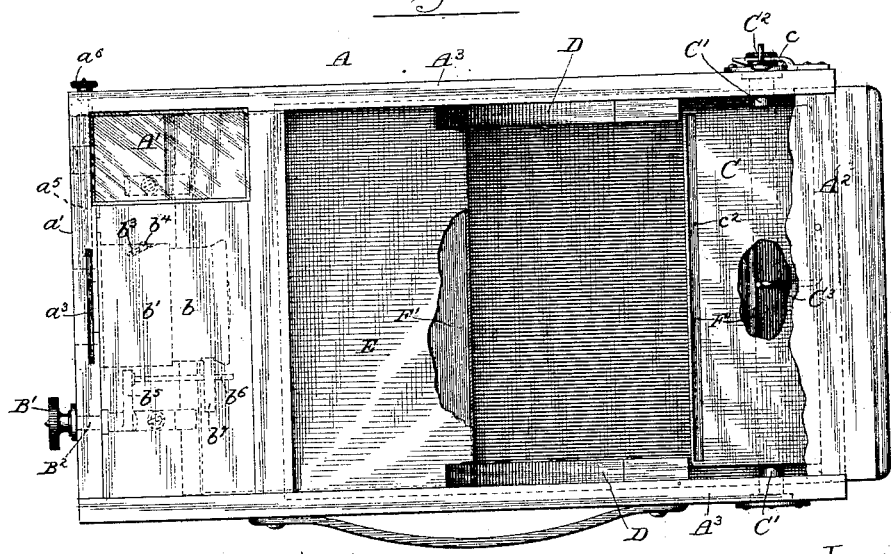

In the drawings, Figure 1 is a central vertical sectional view of a camera embodying my invention. Fig. 2 is a plan view of the same, with a portion of the top lid or slide broken away, in order to more clearly disclose the interior construction. Fig. 3 is a front end view of the camera. Fig. 4 is a perspective view showing the plate-holder employed. Fig. 5 is a perspective view of the end of the primary plate-holder.

In the drawings, A is a box-camera of a familiar construction provided in its front face with an opening $a$, against which a suitable lens is placed. The box is provided, also, in its upper corner near the front end with a "finder" A', of a familiar construction. The finder forms no part of the present invention, and its construction is therefore not more fully described. A removable slide $A^2$ is inserted in the top of the box. The front wall $a'$, in which the opening $a$ is located, is provided with a vertical recess or aperture $a^2$, in which a drop-slide $a^3$ is placed. This slide is provided at its upper end with a notch $a^4$, in which a rod or pin $a^5$ engages. This rod $a^5$ extends at right angles to the direction of movement of the drop-slide $a^3$ and is inserted in a suitable opening in the upper end of the front wall $a'$. A handle $a^6$ in the end of the rod $a^5$ serves as a means of withdrawing the latter from the notch $a^4$, in which case the slide $a^3$ will drop vertically in the slot $a^2$, thus permitting the opening $a^7$ in said slide to register with the opening $a$, whereupon the light will be admitted to the interior of the camera.

The lens B is fitted in one end of a tube $b$, which tube is inserted within an annular flange, collar, or sleeve $b'$, secured to the inside of the wall $a'$, adjacent to the opening $a$. An opening $b^2$ is provided in the end of the annular flanged collar $b'$, which opening registers with the opening $a$. Upon the outside of said collar or sleeve is a slot $b^3$, cut therethrough on a line diagonally with the length of the sleeve. A pin $b^4$, secured to the tube $b$, projects through the slot $b^3$, as will be readily seen from an inspection of Figs. 1 and 2. It is manifest that by turning the tube $b$ within the sleeve $b'$ said tube will be moved out or in, according as it is turned to the right or left, said pin traveling in the direction of the location of the slot $b^3$.

B' is a suitable handle mounted on one end of a revoluble shaft or stud $B^2$, which latter is journaled in the front wall $a'$. The inner end of said shaft is provided with an extending arm $b^5$, upon the end of which is a pin $b^6$, which extends at right angles with the arm $b^5$ and parallel with the shaft or spindle $B^2$. Extending outwardly from the tube $b$ is an arm $b^7$, provided with a suitable slot $b^8$, through which the pin $b^6$ is inserted. It will be obvious that upon revolving the thumb piece or handle B' to the right or left the tube $b$ will be turned to the right or left in the sleeve $b'$ and that the focus of the lens B may be thereby adjusted.

C is a suitable box-frame constituting the primary plate-holding receptacle. Said frame is rigidly mounted upon a spindle C', which latter is suitably journaled in the side walls $A^3$ of the box A. A lever $C^2$ is secured to one end of the spindle C' on the outside of the box, by which lever the spindle and the primary plate-holder C carried thereon may be turned, the plate-holder describing the arc of a circle about the center of the spindle. A suitable latch $c$ upon the outside of the box A serves to retain the lever $C^2$ in its vertical or normal position, as will be readily understood.

The front of the holder C is cut away, as shown at $c'$, through which the interior thereof may be seen. In the front part of the upper portion of the primary receptacle or holder C is a slot $c^2$, extending the entire width of the receptacle, said slot being of such width as to easily permit a single prepared plate and its proper holder to be passed therethrough. The back of the receptacle C is provided with a vertical slot or opening $c^3$, through which one end of a tension-spring $C^3$ is passed. Said spring $C^3$ is secured to the rear wall $a^7$ of the box. The spring $C^3$, extending through the slot $c^3$, presses against the back end of the prepared plates in the primary receptacle C, and causes said plates to stand next to and against the forward end of the receptacle.

On the inside of each side wall $A^3$ of the box is a curved guard D. These guards D D extend toward each other so that the distance between them shall be less than the entire length of the slot $c^2$ in the receptacle C. The guards are so positioned within the case as to permit the receptacle C to be freely turned on its axis, the ends of the receptacle at such time passing under the said guards, as will be readily understood.

Secured to the bottom of the box, on the inside thereof, is a receiving-compartment E, having an opening $e$ in one end thereof, of length and width equal if not greater than the slot $c^2$ of the receptacle C. The opening or slot $e$ is in the rear end of the box A, so that when the receptacle C is turned on its axis into the position illustrated in dotted lines in Fig. 1 the slot $c^2$ will register with the slot $e$.

F is a plate suitably prepared for exposure to the light, and F' is a holder for the same, preferably of light metal, having at its two sides the turned up and bent over edges $f$ $f$. It will be manifest from an inspection of Fig. 4 that the plate F may be placed within the holder by sliding the same endwise upon the plate F' and underneath the turned-up edges $f$. The edges $f$ are not bent over a sufficient distance to impinge against the plate F, the latter simply being loosely and movably retained in the holding-plate F'.

The operation of the device is as follows: The lid $A^2$ is removed and a plate and plateholder are inserted through the slot $c^2$ of the receptacle C. The box is tipped up upon its end $a^6$, and any number of plates desired are similarly inserted in the slot $c^2$ against the action of the spring $C^3$. If desired, the receptacle C may be moved slightly forward, however, and the spring $C^3$ held by the hand in a retracted position against the end $a^6$ until after the receptacle C has been filled with the desired number of plates. The lid $A^2$ is then closed, whereupon all light is excluded from the interior of the box A, which interior is painted black with some suitable material. The lens B is then properly focused for the desired object, the drop-shutter $a^3$ being raised in the position shown in Fig. 1, thus closing the opening $b^2$ and excluding light from the interior of the box. When it is desired to take an impression upon one of the plates F in the primary receptacle C, the rod $a^5$ is withdrawn, the shutter $a^3$ drops, permitting the opening $a^7$ to register with the opening $b^2$, and thus admit light through the lens B. The image of the object to be photographed is then produced upon the first plate F in the receptacle C, said plate extending immediately behind the opening $c'$. After proper exposure the shutter $a^3$ is again raised and locked in position by the pin $a^5$. The handle or lever $C^2$ is next unlatched and turned down into the position shown in dotted lines in Fig. 1, thus bringing the receptacle C into the position shown in dotted lines in said figure, with the opening or slot $c^2$ opposite to the opening $e$ in the receiving-chamber E. The box A is then tilted up upon its forward end $a'$, whereupon the first plate upon which the image has been produced will freely slide out of the receptacle C through the slot $c^2$, and into the receiving-chamber E through the slot $e$. The box A is then tilted back to its normal position, as shown in Fig. 1, and the receptacle C also brought back to its normal position by raising the lever $C^2$. When this position has been resumed by the receptacle C, the spring $C^3$ will press against the plates therein and cause another plate F to move forward immediately behind the opening $c'$ and below the slot $c^2$. The opening $b^2$ may be again opened and closed by the shutter $a^3$ and the operation repeated.

The receptacle C is designed to carry any convenient number of plates—say one dozen—and the receiving-chamber E a similar number. It will be noticed that but one plate F is subject to exposure at a time in the receptacle C, and that none of the other plates receive any portion of light therein or while they are in the receiving-chamber E. It will be noticed that the primary receptacle C is located at the back of the camera, its center being opposite the center of the lens B. It will be noticed that this primary receptacle carries all of its plates with it as it swings, and that it deposits by gravity the lower plate or that which is to receive the impression.

What I claim is—

1. A magazine-camera provided with a primary receptacle pivotally located at the back of the camera, in combination with a receiving-chamber located toward the front end of the camera.

2. A camera comprising a movable primary receptacle located therein and a stationary receiving-receptacle, said primary receptacle when standing in its normal position to hold a plurality of plates being adapted to receive the impression upon the first one of them, and means for tilting said primary receptacle, so that its forward or outer face may be brought in the same plane with the bottom of the receiving-receptacle, substantially as set forth.

3. In a camera, a movable receptacle provided with a slot in its upper end, and a curved guide upon the inside of the camera extending partially over said slot during a portion of the movement of said primary receptacle, whereby the plates in the latter are prevented from falling out of said slot during the tilting of said receptacle, substantially as set forth.

In testimony that I claim the foregoing as my invention I affix my signature in presence of two witnesses.

JAMES LALOR.

Witnesses:
 JOHN F. QUINN,
 R. E. LALOR.